US006436485B1

(12) United States Patent
Sedlmeyr

(10) Patent No.: US 6,436,485 B1
(45) Date of Patent: Aug. 20, 2002

(54) METHOD FOR POWDER-COATING

(75) Inventor: Martin Sedlmeyr, Haar (DE)

(73) Assignee: Advanced Photonics (DE)

( * ) Notice: Subject to any disclaimer, the term of this patent is extended or adjusted under 35 U.S.C. 154(b) by 0 days.

(21) Appl. No.: 09/646,324

(22) PCT Filed: Mar. 16, 1999

(86) PCT No.: PCT/EP99/01720

§ 371 (c)(1), (2), (4) Date: Sep. 15, 2000

(87) PCT Pub. No.: WO99/47276

PCT Pub. Date: Sep. 23, 1999

(30) Foreign Application Priority Data

Mar. 16, 1998 (DE) ........................................ 198 11 319
Jul. 15, 1998 (DE) ........................................ 198 31 781

(51) Int. Cl.[7] .................................................. C08F 2/46

(52) U.S. Cl. ......................... 427/521; 427/58; 427/314; 427/317; 427/322; 427/325; 427/326; 427/385.5; 427/389.9; 427/391; 427/393; 427/393.5; 427/394; 427/395; 427/397; 427/407.1; 427/408; 427/411; 427/413; 427/508; 427/513; 427/557; 427/595

(58) Field of Search .......................... 427/58, 508, 513, 427/557, 559, 385.5, 389.9, 391, 393, 393.5, 394, 395, 397, 314, 317, 322, 325, 326, 407.1, 408, 411, 413, 521, 595

(56) References Cited

U.S. PATENT DOCUMENTS 5,338,578 A 8/1994 Leach

FOREIGN PATENT DOCUMENTS

| | | | |
|---|---|---|---|
| DE | 31 20 026 | A | 3/1982 |
| DE | 195 33 858 | A1 | 7/1997 |
| EP | 0 199 411 | A | 10/1986 |
| EP | 0 330 237 | A | 8/1989 |
| EP | 0 372 740 | A | 6/1990 |
| GB | 2 024 658 | A | 1/1980 |
| GB | 2 056 885 | A | 3/1981 |
| WO | WO 92 01517 | A | 2/1992 |
| WO | WO 95 16814 | A | 6/1995 |

OTHER PUBLICATIONS

Infrarot (IR) und ihre industrille Anwendung Kautschuk Und Gummi–Kunststoffe., Bd. 36, Nr. 10, Oktober 1983.
Patent Abstracts of Japan vol. 095, No. 007, Aug. 31, 1995.
Patent Abstracts of Japan vol. 018, No. 149 (No Date Avail.).
Patent Abstracts of Japan vol. 095, No. 006, Jul. 1995.

*Primary Examiner*—Bernard Pianalto
(74) *Attorney, Agent, or Firm*—Marshall, Gerstein & Borun

(57) ABSTRACT

The invention relates to a method of applying a powder coating to a substrate (5), in particular a temperature-sensitive substrate such as wood, wood-fiber material, plastic, rubber, cloth, paper or cardboard, wherein a thermoreactive powder is applied as a base layer (6) to the uncoated surface of the substrate (5), and wherein by means of infrared radiation with at least some components in the near and/or short-wave infrared region the powder is warmed throughout to the cross-linking temperature and cured, or is warmed throughout to the gelling temperature and in a subsequent processing step cross-linking is completed and the coating is cured. To generate the infrared radiation in particular halogen bulbs (7) are used in combination with a reflector (8) to reflect the emitted radiation towards the substrate. The halogen bulbs (7) are operated in such a way that the emitted radiation has a flux-density maximum in the near infrared.

18 Claims, 1 Drawing Sheet

METHOD FOR POWDER-COATING

DESCRIPTION

The invention relates to a method of applying a powder coating to a substrate, in particular a temperature-sensitive substrate such as wood, wood-fibre material, plastic, rubber, cloth, paper or cardboard. The invention further relates to the use of a halogen bulb for the powder-coating process.

A crucial factor in the cross-linking and curing of a coating powder is that the powder be warmed to the curing temperature as homogeneously and rapidly as possible. It is only in this way that the molten powder can reach the viscosity minimum without being considerably hindered from spreading out by the early occurrence of cross-linking reactions. A non-optimal spreading of the powder would result in unevenness of the surface.

In a known method of cross-linking thermoreactive powder, the necessary curing temperature is reached by energy transfer that takes place in several steps. First, by infrared (IR) radiation or convection, the surface of the powder layer is warmed. Only thereafter is the interior of the powder layer heated, by thermal conduction processes, down to the substrate interface. There the energy, in particular in the case of metallic substrates, is dissipated into the substrate much more rapidly because of the higher thermal conductivity. Not until the substrate has been almost completely warmed throughout does the interface reach the necessary cross-linking temperature. In this known method the sole driving process for warming the interior of the powder layer is the temperature gradient between the surface of the layer and the substrate. To ensure a homogeneous cross-linking and perfect adhesion to the substrate, heating times of several minutes are required.

Frequently the cross-linking and curing temperatures of coating powders are between 120° C. and 300° C. Because these temperatures are so high it is impossible, or possible only with restrictions, to apply a powder coating to temperature-sensitive substrates by the known method.

There is another known method of cross-linking and curing a layer of thermoreactive powder on a substrate, in which prior to application of the thermoreactive powder a primer is applied to the surface of the substrate. The primer consists, for example, of water-based lacquer. In particular for substrates made of wood or wood-fibre materials, the primer serves to smooth out inhomogeneities in the surface structure, to form a barrier to moisture, and to enable adhesion of thermoreactive powder. The powder can subsequently be cross-linked and cured by exposure to electromagnetic radiation, in particular radiation at wavelengths in the middle of the infrared region. In this known method the primer also constitutes a barrier to thermal conduction, which hampers heat transfer to the substrate during the cross-linking reaction in the powder layer. In particular for temperature-sensitive substrates, this is the only means by which application of a powder coating becomes possible at all. However, the only thermoreactive powders with which this known method can be used are those having a cross-linking temperature only slightly higher than the temperature that would damage the substrate.

In the case of substrates that contain or absorb moisture, in particular wood or wood-fibre materials, another problem with the known methods is that although it is desirable for the substrate to have a certain minimal moisture content, the moisture hinders the application of a uniform powder coating. Moisture in the substrate on one hand enables an electrostatic charge to be established so that thermoreactive powder can be deposited on the charged surface. But on the other hand, during the subsequent cross-linking and curing reaction the moisture in the substrate vaporizes, because during the long reaction period at temperatures above the vaporization temperature, the substrate is heated to the vaporization temperature at least at its surface. Therefore at the surface, below the already cross-linked powder, bubbles form which cause irregularities in the coating layer. Even a primer layer is of no help here, because it is not effective as a thermal-conduction barrier in the long term, and the vaporization temperatures are usually considerably lower than the cross-linking and curing temperatures of the thermoreactive powder. Furthermore, for instance in the case of a water-based primer, it is necessary to wait until the primer has completely dried before a layer of coating powder can be applied to the primer.

The known methods also present the difficulty that because the heating of the powder coating penetrates only to slight depths, a relatively long heating period is needed before a fusion between the powder layer and the substrate surface or the primer can be completed.

The object of the invention is to disclose a method for the powder coating of a substrate, in particular a temperature-sensitive substrate such as wood, wood-fibre material, plastic, rubber, cloth, paper or cardboard, that enables the powder to be applied to the unprotected surface of the substrate without damaging the substrate, and that produces a uniform, completely cross-linked and tightly adhering coating.

An essential idea in the method of applying a powder coating in accordance with the invention is that the energy required for cross-linking is supplied to the powder in a targeted manner such that it penetrates the entire thickness of the powder layer, which is applied as a base layer to the substrate without any other underlying layer. The gelling or cross-linking energy is introduced into the base layer, at least, in the form of radiation energy and is absorbed there. The radiation used for this purpose comprises at least some components in the near and/or short-wave infrared region. Preferably the powder layer and the substrate surface are warmed homogeneously by near-infrared (NIR) radiation and in a matter of seconds are brought to the required gelling or cross-linking temperature. The term "near infrared" denotes the wavelength range between the visible region and 1.2 $\mu$m wavelength. The term "short-wave infrared" denotes the wavelength range between 1.2 $\mu$m and 2 $\mu$m.

In accordance with the invention the infrared radiation either heats the thermoreactive powder to the cross-linking temperature and cures it, or heats the powder to the gelling temperature, after which in a subsequent processing step the cross-linking is completed and the powder is cured. In the latter case the gelling step binds the powder together without causing complete cross-linking or curing to form a finished coating.

The targeted introduction of energy by means of infrared radiation, in particular NIR radiation, preferably such that the energy is homogeneously distributed over the thickness of the base layer, accelerates the process of binding or cross-linking of the powder particles so that it is considerably faster than in the known method, in which the introduction of energy into the depths of the base layer occurs substantially by thermal conduction. In addition, the present means of introducing energy provides excellent control of the binding or cross-linking process, in particular because precisely the desired rate of progress can be achieved by controlling the radiation flux density, the spectral distribution of the radiant energy and/or the duration of irradiation. It is advantageous for the above-mentioned process parameters to be adjusted to suit the absorption properties of the thermoreactive powder, the reflection properties of the substrate surface, and the thermal conductivity of the substrate.

Furthermore, the rapid heating throughout the base layer ensures good adhesion to the substrate surface.

Preferably after the base layer has been cured or undergone a preliminary gelling process, a second layer of a thermoreactive powder is applied and the entire, not yet completely cross-linked coating is cross-linked and cured by infrared radiation. In a further development of the method the base layer, after it has been cured or gelled, is cooled below the gelling or curing temperature, preferably by compressed air flowing against or along the surface. In an alternative embodiment the second layer is applied immediately after curing or preliminary gelling.

By adding the second layer, with the application and curing of which the coating process is in particular concluded, it is possible to make the surface of the coating sufficiently uniform to satisfy the highest quality criteria. In particular, the second layer evens out irregularities in the base layer, so that the surface, for instance, can be made uniformly shiny or matte throughout. In contrast to known powder coatings with UV-powder lacquers, matte coating surfaces can be obtained with both the first and the second. In comparison to methods in which there are two layers of different materials, a primer layer and a second layer produced from powder, here in particular when the same kind of powder is used for the base layer and the second layer, the finished coating is especially homogeneous and uniformly cross-linked throughout its entire thickness. Advantages of this powder-coating system are thus in particular associated with the robustness of the coating and its resistance to abrasion and chemicals.

With the two-layer variant of the method in accordance with the invention, in particular substrates such as wood and those containing wood-fibre (in brief: wood-fibre materials) can be given a high-quality coating formed from powder. On one hand, because of the targeted control of the cross-linking and curing processes described above, irregularities in the coating due to the formation of moisture bubbles can be prevented. On the other hand, this variant also overcomes the problem of nonuniform adhesion of powder particles to an unprotected surface made at least in part from wood fibres. The base layer serves for adhesion, and in some circumstances may still have an irregular surface or even consist of individual spots of coating separated from one another like islands. But once it has cured or undergone preliminary gelling, it provides much better initial conditions for the second layer. Adhesion is improved and therefore, as a rule, when the powder for the second layer is applied, more material can be used. In the subsequent cross-linking and curing of the entire, not yet or only partially cross-linked coating material, the whole mass of coating material fuses to form a uniform coating layer.

Preferably the powdery base layer and/or the second layer is in each case irradiated for no longer than 12 seconds, in particular no longer than 8 s, until gelling or curing is completed. After a second layer has been applied, however, the subsequent radiation penetrates so deeply that irradiation of the base layer continues, so that the overall duration of base-layer irradiation can be longer than 12 or 8 seconds.

In particular in order to increase still further the controllability of the rate at which the process advances, in a further development of the method the surface temperature of the thermoreactive powder is measured with a pyrometer and regulated by controlling the flux density of the infrared radiation. Thus specified time courses of the powder-coating temperature can be produced, for instance with a rapid temperature increase followed by a phase of temporally constant temperature, so as to continue the cross-linking process at a temperature just above the minimal cross-linking temperature until curing has been completed.

Preferably the infrared radiation is generated by a high-power halogen bulb with a radiation temperature of more than 2500 K. Radiation sources of this kind generate electromagnetic radiation with very high flux densities, which in particular enable the cross-linking temperature to be reached within a few seconds. Preferably the halogen bulb contains filaments, in particular heating coils, with low mass, so that a rapid-reaction control of the radiation flux density is possible. In a particularly preferred embodiment the halogen bulb is combined with a reflector to reflect the emitted radiation towards the substrate, and the halogen bulb is operated in such a way that the emitted radiation has a flux-density peak in the near infrared. The surface temperature of the incandescent filament is can be set to values as high as 3500 K. Preferably line-source halogen bulbs are used in combination with channel-like, ellipsoid or parabolic reflectors.

It is advantageous for the uncoated surface of the substrate, in particular a substrate made of plastic, to be pretreated so as to improve its conductivity for electrostatic application of the thermoreactive powder. In a particular embodiment an electrically conducting liquid is applied to the surface of the substrate.

In particular for the powder-coating of a substrate that contains or absorbs moisture, a specified moisture content is produced by drying and/or moistening the substrate before the base layer is applied. In this way especially uniform powder coatings can be achieved and the process parameters can be varied within certain limits without impairing the quality of the coating.

Preferably the pretreatment for drying moist substrates such as wood or wood-composite materials prior to powder application, in particular the only pretreatment, is to irradiate the substrate surface so as to introduce an amount of energy equal to or greater than that needed for the actual cross-linking process, in particular by NIR radiation. This amount of energy brings the surface to a temperature above the melting point of the powder system. Subsequently the thermoreactive powder is applied to the substrate surface as a base layer. The thermoreactive powder then melts immediately and, where appropriate, is cross-linked completely by continued irradiation. Pretreatment of the substrate surface increases the efficacy of the powder application severalfold. At the same time it prevents moisture deposited at the substrate surface from being driven out during the actual cross-linking process, which could interfere with formation of a homogeneous film.

In the following exemplary embodiments of the invention are described with reference to the attached drawings. However, the invention is not limited to these exemplary embodiments. The individual figures in the drawings are as follows:

Figure 1:
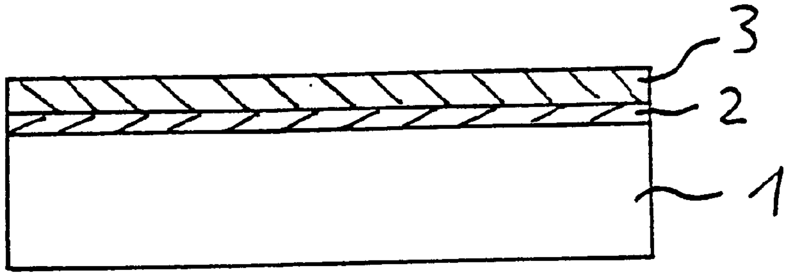
FIG. 1 shows a medium-density fibre plate (MDF) coated with two layers of powder.

The substrate shown in FIG. 1 consists of a medium-density fibre plate (MDF) 1 that has been coated with a base layer of thermoreactive powder plus a second layer, likewise of thermoreactive powder. For this process, the MDF 1 was earthed on the side that was not to be coated, and by means of the tribo-method the thermoreactive powder forming the first coating 2 was applied to the uncoated surface of the MDF 1. Subsequently the base layer was irradiated for 5 s with infrared radiation from a source having a radiation flux density maximum at about 1 μm wavelength, by which time the powder had been heated to its gelling temperature. This temperature, approximately homogeneous over the thickness of the first coating layer 2, was maintained for about 1 s. Then the irradiation process was interrupted.

During the gelling process the substrate was warmed only at its surface and only slightly, so that the water bound in the MDF 1 did not emerge at the surface and the uniformity of the coating was unimpaired.

After it had cooled, the MDF 1 was earthed on its uncoated side and the tribo-method was used to apply thermoreactive powder for the second coating layer 3 to the surface of the first coating layer 2. Subsequently the first 2 and the second 3 coating layer were irradiated for about 6 seconds with the infrared radiation having a flux-density maximum at a wavelength of about 1 μm, until the cross-linking temperature had been reached. By continuing the irradiation with lower flux density for about 3 seconds, the cross-linking reaction was continued until both coating layers had been completely cured. Then the irradiation was stopped and the layers were allowed to cool for a few seconds, until they were distinctly below the cross-linking temperature. During the second irradiation process, again, no vapour or gas bubbles that could have caused irregularity in the coating were formed.

In other tests samples of MDF, not shown here, with surface contours were also coated immediately after a drying pretreatment with NIR irradiation. In these cases, too, even when the powder was applied in a single layer, coatings of uniform thickness with a smooth surface were obtained.

Figure 2:
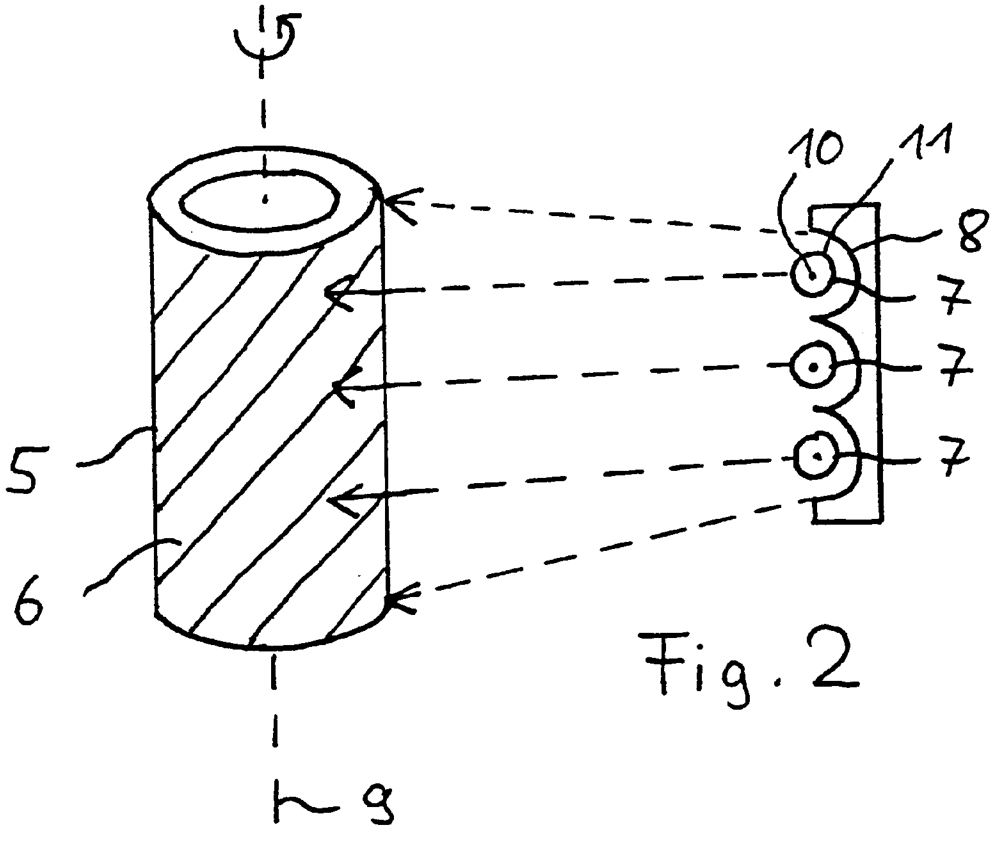
FIG. 2 shows an arrangement for the cross-linking of a powder coating on a plastic substrate with a closed, continuous surface.

FIG. 2 shows a hollow cylinder 5 made of plastic, which is being irradiated by a total of 3 halogen-tube radiators 7. The cylinder 5 consists, for example, of acrylonitrile-butadiene-styrol (ABS), of polypropylene (PP) or of polyethylene (PE). The powder used to coat its outer, cylindrical surface, as is also the case for MDF, consists for example of polyester resin, epoxy or epoxy/polyester.

In FIG. 2 can also be seen the halogen-tube radiators 7 and a reflector 8 combined therewith. The reflector geometry is such that uniform irradiation is ensured over the length of the hollow cylinder 5. In a variant of the reflector arrangement according to FIG. 2, the halogen-tube radiators and the channel profiles of the reflector are oriented with their long directions approximately parallel to the axis of rotation of the cylinder.

The hollow cylinder 5 bears a coating layer 6 of thermoreactive powder. To apply the coating layer 6 the surface of the cylinder 5 was first sprayed with isopropyl alcohol. Then the alcohol layer was earthed and the thermoreactive powder was applied. Subsequently irradiation with infrared radiation from the halogen-tube radiators 7 was begun, during which the cylinder 5 was rotated at a rate of about one rotation in six seconds. In a variant of the method the hollow cylinder 5 is turned at a higher rotation rate, in particular a rate of five rotations per second. The irradiation was stopped after about six seconds. At this time the coating layer 6 was completely cross-linked and cured. There was no need to apply a second coating layer to the cylinder 5 because the first layer already had a uniform and homogeneous appearance.

The halogen-tube radiators 7 in FIG. 2 comprise a heating coil 10 of low mass in a quartz-glass tube 11. The two ends of the coil 10 are each cooled by a stream of compressed air, to increase the working life of the radiator 7. Similarly, the reflector 8 is cooled by compressed air or liquid, to create constant conditions for reflection of the radiation emitted by the halogen-tube radiators.

With the method of applying a powder coating to a substrate in accordance with the invention the processes of cross-linking and curing the powder layer can be accomplished in distinctly shorter times than with the known methods. Furthermore, it is possible to cross-link powder coatings on heat-sensitive substrates. Focussing arrangements employing reflectors enable a targeted irradiation, matched to the geometry of the substrate. Thus the introduction of energy can be made homogeneous both over the entire extent of the surface of the substrate or the coating, and throughout the depth or thickness of the coating. When halogen bulbs with low heating-filament inertia are used, the cross-linking process can also be controlled with precise timing, so that it is possible to burn in even coating powders that have a cross-linking temperature higher than the temperature at which the heat-sensitive substrate would be damaged.

LIST OF REFERENCE NUMERALS

1 MDF
2 First coating layer
3 Second coating layer
5 Hollow cylinder
6 Coating layer
7 Halogen-tube radiator
8 Reflector
9 Axis of rotation
10 Heating coil
11 Quartz-glass tube

What is claimed is:

1. Method of applying a powder coating to a substrate, in particular a temperature-sensitive substrate such as wood, wood-fibre material, plastic, rubber, cloth, paper or cardboard, wherein a thermoreactive powder is applied as a base layer to the uncoated surface of the substrate, wherein by means of infrared radiation with at least some components in the near and/or short-wave infrared region the powder is warmed throughout to the cross-linking temperature and cured, or is warmed throughout to the gelling temperature, after which cross-linking is completed and the coating is cured in a subsequent processing step, and wherein the surface temperature of the thermoreactive powder is measured by means of a pyrometer and is regulated by controlling the flux density of the infrared radiation.

2. Method according to claim 1, wherein to the cured or pre-gelled base layer a second layer of thermoreactive powder is applied and the entire, not yet completely cross-linked coating is cross-linked and cured by means of the infrared radiation.

3. Method according to claim 1, wherein after the curing or gelling of the base layer this layer is cooled to a temperature below the curing or gelling temperature.

4. Method according to claim 1, wherein the powder layer is irradiated in each case for no longer than 12 seconds, in particular no longer than 8 seconds, until gelling or curing has occurred.

5. Method according to claim 1, for applying a powder coating to a substrate that contains or absorbs moisture, wherein by drying and/or moistening the substrate before the base layer is applied, a specified moisture content is produced.

6. Method according to claim 5, wherein to dry the moisture-containing substrate the surface of the substrate is irradiated so as to introduce an amount of energy equal to or higher than that required for cross-linking.

7. Method according to claim 1, wherein the uncoated surface of the substrate is pretreated to improve the adhesion of the thermoreactive power, in particular by applying an electrically conducting liquid.

8. Method according to claim 1, including providing a halogen bulb and a reflector, wherein the halogen bulb is combined with the reflector for reflection of the emitted radiation towards the substrate, and wherein the halogen bulb is operated in such a way that the flux-density maximum of the emitted radiation is in the near infrared.

9. Method of applying a powder coating to a substrate, in particular a temperature-sensitive substrate such as wood, wood-fibre material, plastic, rubber, cloth, paper or cardboard, wherein a thermoreactive powder is applied as a base layer to the uncoated surface of the substrate, wherein by means of infrared radiation with at least some components in the near and/or short-wave infrared region the powder is warmed throughout to the cross-linking temperature and cured, or is warmed throughout to the gelling temperature, after which cross-linking is completed and the coating is cured in a subsequent processing step, for applying a powder coating to a substrate that contains or absorbs moisture, wherein by drying and/or moistening the substrate before the base layer is applied, a specified moisture content is produced, wherein to dry the moisture-containing substrate the surface of the substrate is irradiated so as to introduce an amount of energy equal to or higher than that required for cross-linking, and wherein the substrate surface is heated by irradiation to a temperature above the melting temperature of the thermoreactive powder, so that at least a part of the thermoreactive powder melts immediately upon being applied to the substrate surface.

10. Method of applying a powder coating to a substrate, in particular a temperature-sensitive substrate such as wood, wood-fibre material, plastic, rubber, cloth, paper or cardboard, wherein a thermoreactive powder is applied as a base layer to the uncoated surface of the substrate, wherein by means of infrared radiation with at least some components in the near and/or short-wave infrared region the powder is warmed throughout to the cross-linking temperature and cured, or is warmed throughout to the gelling temperature, after which cross-linking is completed and the coating is cured in a subsequent processing step, and wherein to generate the infrared radiation at least one high-power halogen bulb with a radiation temperature of more than 2500 K is employed.

11. Method according to claim 10, including providing a halogen bulb and a reflector, wherein the halogen bulb is combined with the reflector for reflection of the emitted radiation towards the substrate, and wherein the halogen bulb is operated in such a way that the flux-density maximum of the emitted radiation is in the near infrared.

12. Method according to claim 10, wherein to the cured or pre-gelled base layer a second layer of thermoreactive powder is applied and the entire, not yet completely cross-linked coating is cross-linked and cured by means of the infrared radiation.

13. Method according to claim 12, wherein after the curing or gelling of the base layer this layer is cooled to a temperature below the curing or gelling temperature.

14. Method according to claim 10, wherein the powder layer is irradiated in each case for no longer than 12 seconds, in particular no longer than 8 seconds, until gelling or curing has occurred.

15. Method according to claim 10, wherein the uncoated surface of the substrate is pretreated to improve the adhesion of the thermoreactive powder, in particular by applying an electrically conducting liquid.

16. Method according to claim 10, for applying a powder coating to a substrate that contains or absorbs moisture, wherein by drying and/or moistening the substrate before the base layer is applied, a specified moisture content is produced.

17. Method according to claim 16, wherein to dry the moisture-containing substrate the surface of the substrate is irradiated so as to introduce an amount of energy equal to or higher than that required for cross-linking.

18. Method according to claim 17, wherein the substrate surface is heated by irradiation to a temperature above the melting temperature of the thermoreactive powder, so that at least a part of the thermoreactive powder melts immediately upon being applied to the substrate surface.

* * * * *